July 8, 1924.

G. L. GRADER

GAS VALVE

Filed Sept. 10, 1921

1,500,868

George L. Grader
INVENTOR

BY Victor J. Evans
ATTORNEY

WITNESS: Fred W. Ely

1,500,868

Patented July 8, 1924.

UNITED STATES PATENT OFFICE.

GEORGE LOUIS GRADER, OF BROOKLYN, NEW YORK.

GAS VALVE.

Application filed September 10, 1921. Serial No. 499,693.

*To all whom it may concern:*

Be it known that I, GEORGE LOUIS GRADER, a citizen of the United States, residing at Brooklyn, in the county of Kings and State of New York, have invented new and useful Improvements in Gas Valves, of which the following is a specification.

This invention relates to gas valves and particularly to means for preventing accidental turning on of the same. The principal object is to produce a device of this nature which shall be simple of construction, cheap to manufacture, and highly efficient for the purpose for which it is designed.

With these and other objects in view which will be more apparent as the specification proceeds, the invention relates to certain novel construction and combination and arrangement of parts, the essential features of which are hereinafter fully described, are particularly pointed out in the appended claims, and are illustrated in the accompanying drawing in which:—

Like characters of reference refer to like parts in all views.

Figure 1:
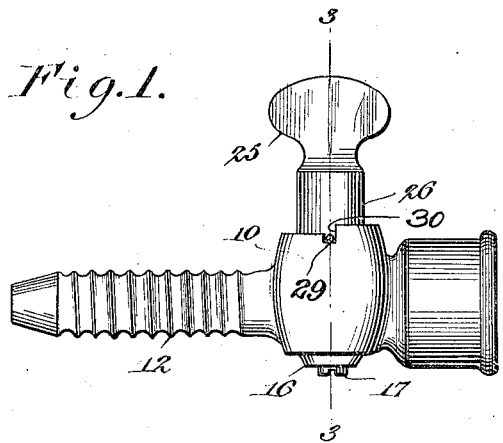
Figure 1 is an elevation of my improved gas cock.
Figure 2:
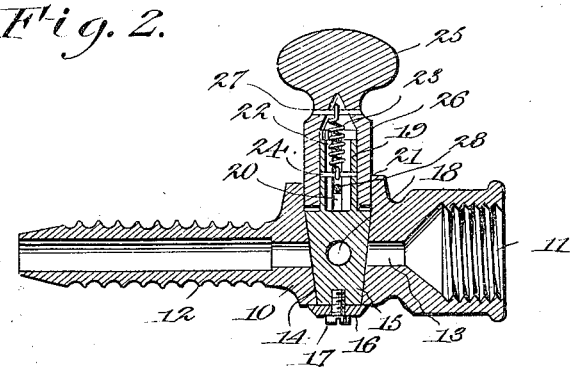
Figure 2 is a longitudinal sectional view of the same.
Figure 3:
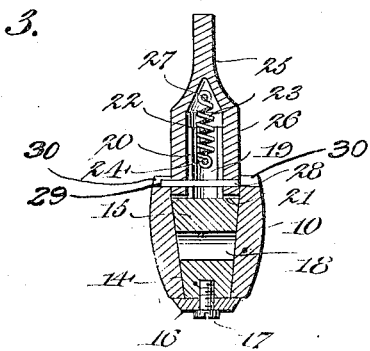
Figure 3 is a transverse section on line 3—3 of Figure 1.

Referring to the drawing in detail, 10 represents the body or shell of a gas cock having one end enlarged and internally threaded as at 11 to screw onto the end of the gas pipe, and having its opposite end 12 formed for convenient attachment to a gas hose or burner. This casting 10 is provided with a way or gas passage 13 which is intercepted by a conical valve seat 14.

Seated in the valve seat 14 is a conical valve member 15 which is secured against axial displacement by a washer 16 and screw 17. Valve 15 is provided with a way 18 which may be brought into and out of register with the way 13 upon turning valve 15. The valve is formed at its larger end, with a reduced cylindrical portion 19 which is slotted axially at 20 as far as the shoulder 21 formed at the line of reduction of diameter. The free end of element 19 is also bored out at 22 to form a housing for a spring 23 one end of which is anchored by a pin 24 to element 19.

A key or finger piece is shown at 25 and is formed with a cylindrical shank 26 which is bored out so as to receive element 19 of the valve. The other end of spring 23 is anchored to member 25 by a pin 27. A pin 28 passes through element 26 diametrically and projects slightly beyond 26 at one end. In the construction as shown, the pin 28 works in the inner portion of slot 20 and is prevented from moving upwardly more than a predetermined amount, by the pin 24.

The main body 10 is provided with diametrically opposite slots 29 into one or the other of which the pin 28 is forced by spring 23 whenever the ways 18 and 13 are completely out of register.—i. e. when the gas is turned off.

In operation, when it is desired to turn on the gas, the operator pulls axially on key 25 so as to dislodge pin 28 from the slot 29 in which it is resting. The key 25 is then turned and by pin 28 in slot 20, turns valve 15 until ways 13 and 18 register. To turn off merely turn the key until pin 28 strikes one of the shoulders 30 adjacent to slots 29, whereupon spring 23 draws in member 25 with the pin 28 engaging the slot 29.

What is claimed as new is:—

A gas cock comprising a body portion, opposed shoulders formed on the top of said body portion, recesses adjacent said shoulders, a valve having a reduced cylindrical end formed with an axial slot, a key formed to fit over said end of said valve, a pin carried by said key and passing through said slot and through and beyond one side of said slot and through and beyond one side of said slot and to co-act with said recesses, and a spring connecting said valve and key and operable to cause said pin to co-act with slots in said body portion the shoulders serving as stops for limiting the movement of said pin in either direction as and for the purpose set forth.

In testimony whereof I have affixed my signature.

GEORGE LOUIS GRADER.